April 17, 1934.  E. T. TURNER  1,955,694
WATER SOFTENING APPARATUS
Original Filed Feb. 25, 1925  3 Sheets-Sheet 2

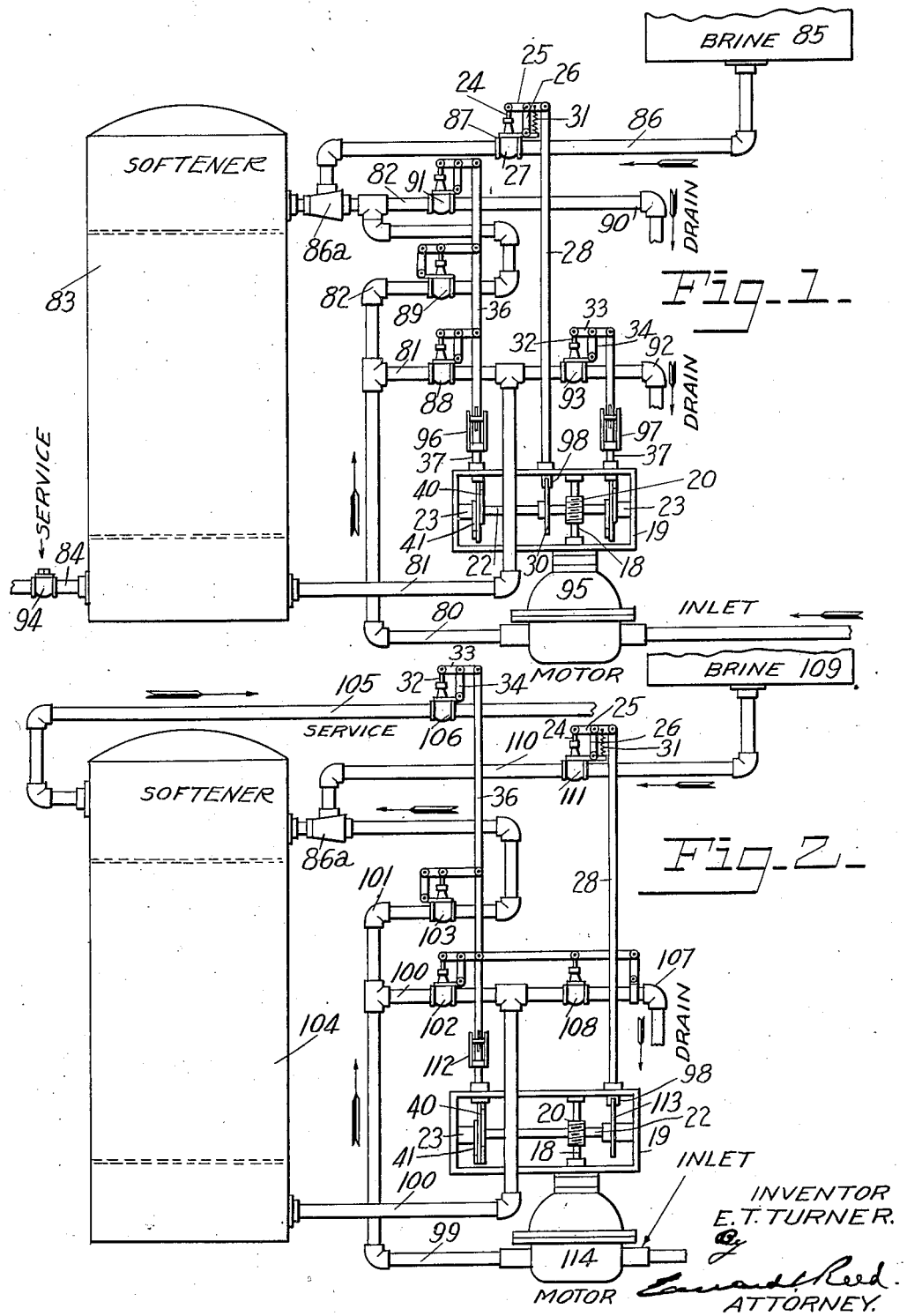

INVENTOR.
E. T. TURNER.
ATTORNEY.

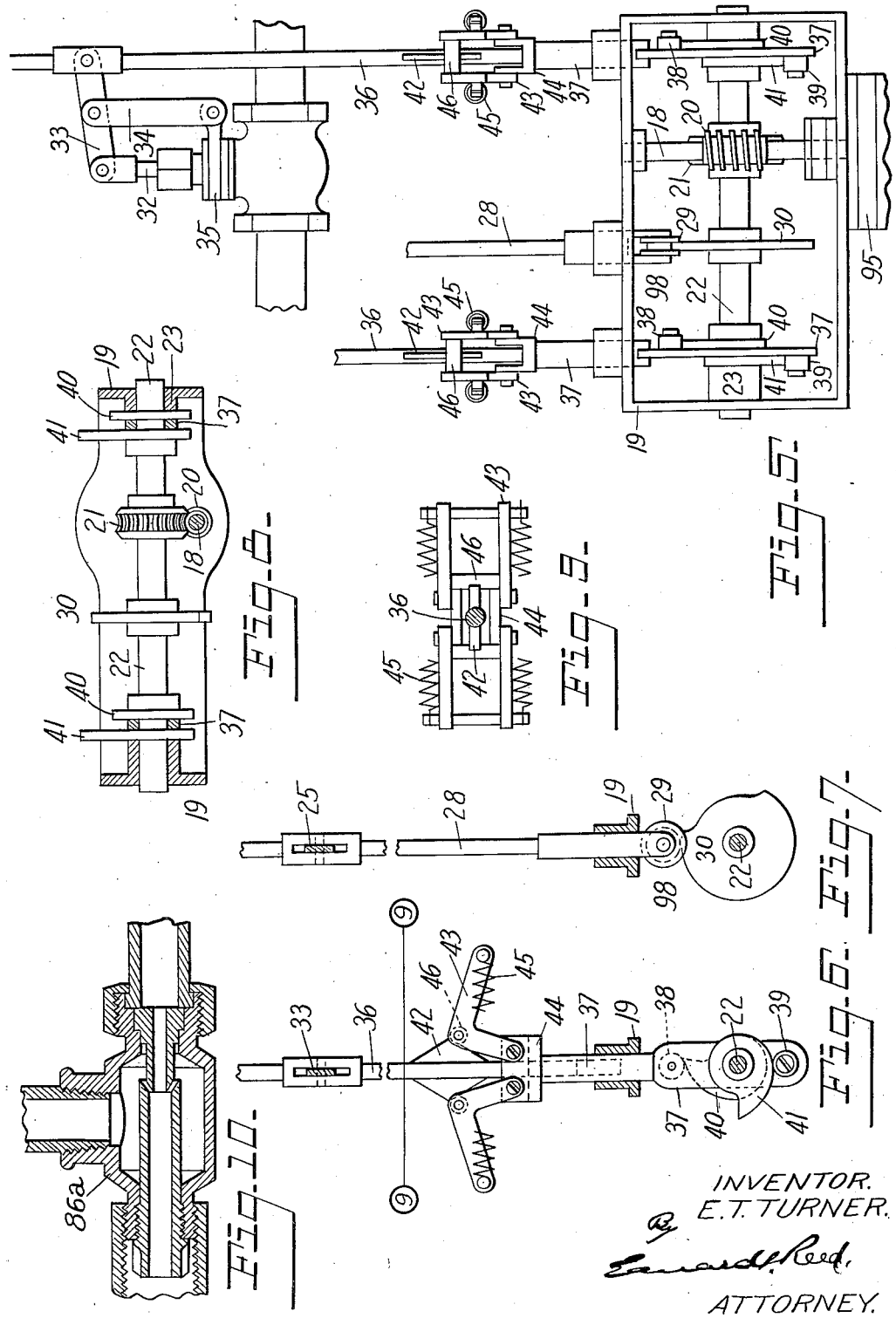

Patented Apr. 17, 1934

1,955,694

UNITED STATES PATENT OFFICE 1,955,694

WATER SOFTENING APPARATUS

Edward T. Turner, Dayton, Ohio, assignor to General Water Treatment Corporation, New York, N. Y., a corporation of Delaware Original application February 25, 1925, Serial No. 11,435. Divided and this application August 14, 1925, Serial No. 50,171. Renewed June 28, 1933

21 Claims. (Cl. 210—24)

This invention relates to water softening apparatus and more particularly to that type of water softening apparatus which employs as a water softening agent a material having the property of exchanging its normal base for the substances which render the water hard, such as zeolite, glauconite and the like.

In the normal operation of a water softener of this character the water softening material gradually loses its softening property as it gives up its normal base and absorbs the calcium, magnesium or the like, from the water. Consequently at intervals, dependent upon the quantity of water softened, it is necessary to recondition the water softening material by first subjecting it to the action of a regenerating solution, such as salt water, which will displace the substances absorbed from the hard water and retsore the normal base of the material, and to then rinse or wash out the water softening material and its container to remove the regenerating solution and sediment therefrom. The reconditioning is usually manually controlled and it is necessary for the person in charge of the apparatus to interrupt the flow of hard water to the container and introduce therein the necessary salt water and, after this salt solution has remained in contact with the water softening material for a sufficient length of time, to wash out the container and reconnect the same with the city water and the service line. These operations are all performed by hand and as each operation is effective for a considerable length of time the manual control of the mechanism results in considerable inconvenience and because of this inconvenience the reconditioning is likely to be neglected.

The present application is a division of the application filed by me February 25, 1925, Serial No. 11,435, in which there was shown and described a water softening apparatus which is automatically controlled to effect the reconditioning of the water softening material at periods determined by the quantity of water delivered to the container.

One object of the invention is to provide such an automatic water softening device in which the flow of water through the container will be reversed during the reconditioning operation.

A further object of the invention is to provide such an apparatus which will be simple in its construction and positive in its operation.

Other objects of the invention will appear as the device is described in detail.

Figure 3:
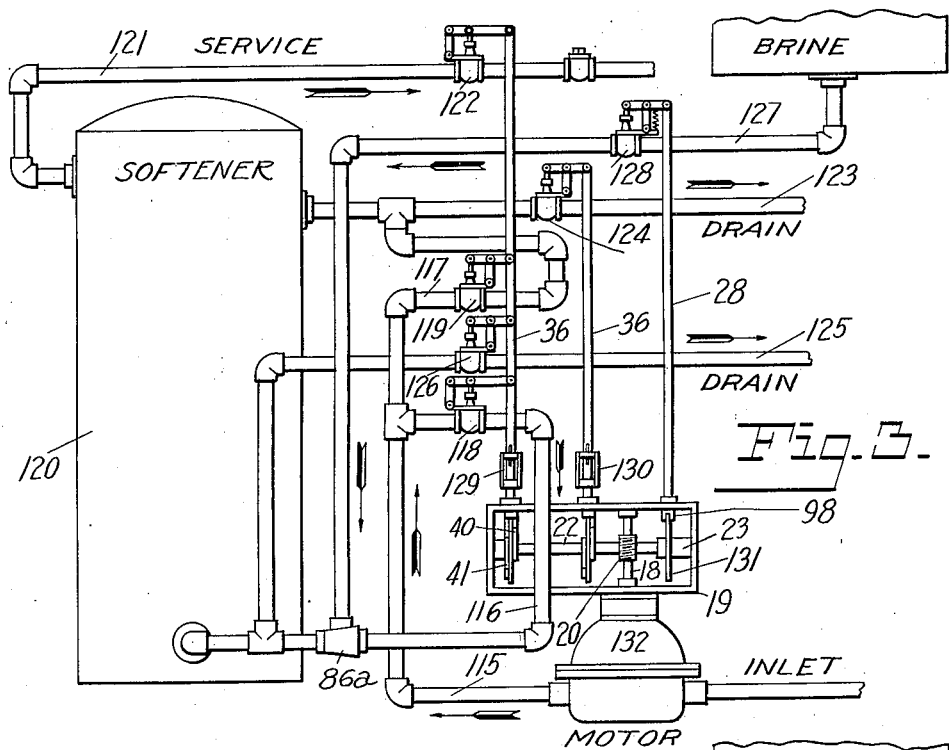
Figure 4:
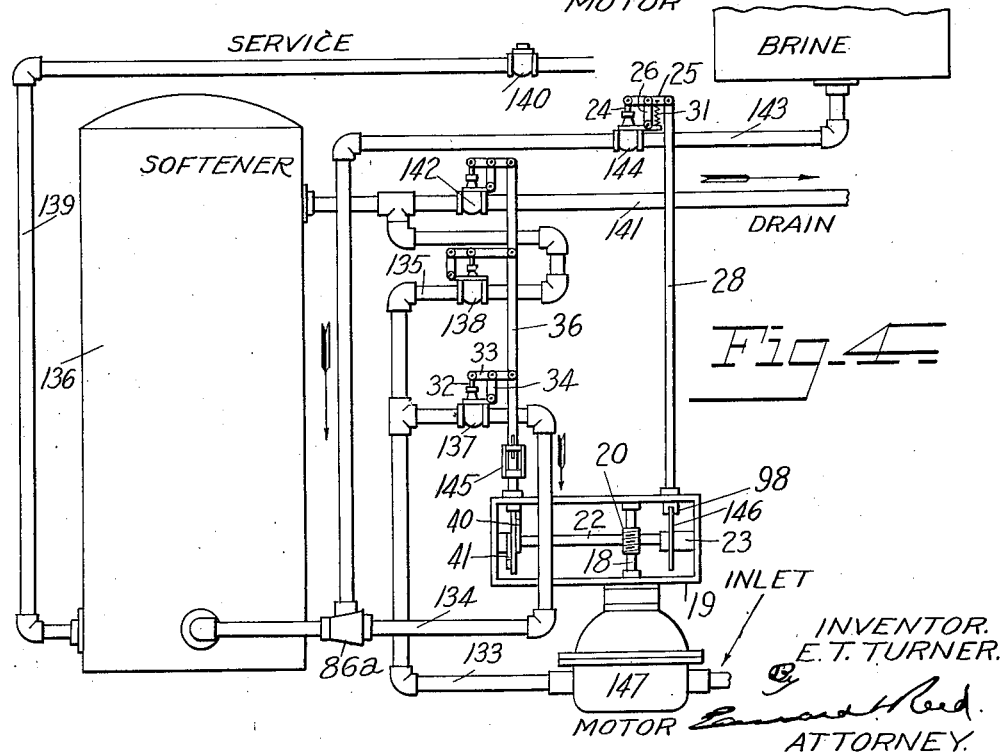

In the accompanying drawings Fig. 1 is a side elevation of a water softening apparatus embodying my invention; Fig. 2 is a similar view of a slightly modified form of the apparatus; Fig. 3 is a similar view showing a further modification of the controlling mechanism; Fig. 4 is a similar view showing still another arrangement of the controlling mechanism; Fig. 5 is a detail view of an automatic valve operating device; Fig. 6 is a side elevation, partly in section, of the valve actuating device shown in Fig. 5; Fig. 7 is a side elevation, partly in section, of another valve actuating device; Fig. 8 is a sectional detail view of the cam shaft forming part of the valve controlling mechanism; Fig. 9 is a section taken on the line 9—9 of Fig. 6; and Fig. 10 is a sectional detail of the injector.

In these drawings I have illustrated one embodiment of my invention, together with several modified arrangements of the controlling devices, but it will be understood that these forms have been chosen for the purpose of illustration only, that the apparatus may take various forms and the control thereof may be effected in various ways without departing from the spirit of the invention.

As shown in Fig. 1, the apparatus comprises a water softening unit consisting of a container 83 which is adapted to contain a suitable quantity of water softening material, such as zeolite, glauconite or the like. The water to be softened is supplied to this container through a supply pipe 80 which leads from a suitable source of water supply, such as city water mains, and is provided with means whereby it may be connected with either end of the container. As here shown, the pipe 80 has two branches 81 and 82 communicating respectively with the lower and upper ends of the container. A service pipe 84 leads from one end of the container, in the present instance the lower end, to a distributing system or other point of discharge. A source of supply for regenerating solution, such as a brine tank 85, is connected with the container by means of a pipe 86 which, in the present instance, leads to the upper end of the container and is here shown as connected with the upper branch 82 of the supply pipe so that the brine is introduced into the container along with water passing thereto from the supply line, an injector 86a being provided to facilitate the introduction of the regenerating solution, as shown and described in the above mentioned application. The flow of solution through the pipe 86 is controlled by a valve 87. The two branches 81 and 82 of the supply pipe are controlled respectively by valves 88 and 89. A drain pipe is connected with the container at that end opposite the end into which the regenerating solution is introduced. In the present instance, I have provided drain pipes at both ends of the container for reasons which will hereinafter appear. Preferably these drain pipes are connected through the respective branches of the supply pipe. One of these drain pipes is shown at 90 as connected with the branch 82 of the supply pipe between the valve 89 and the container and is controlled by a valve 91. The second drain pipe 92 is connected with the branch 81 of the supply pipe at a point between the valve 88 and the container and is controlled by a valve 93. During the water softening operation the valve 88 of the lower branch of the supply pipe, the valves 91 and 93 of the drain pipes and the valve 87 of the regenerating solution pipe are closed, the valve 89 in the branch 82 of the supply pipe only being open. Thus the water is caused to enter the container near the upper end thereof and to pass downwardly through the water softening material and out through the service pipe, which is here shown as controlled by a check valve 94, which will be closed by the back pressure in the service line, when one of the drain valves is open, as described in the above mentioned application. This particular arrangement contemplates the upward flow of the wash water preliminary to the regenerating operation to dislodge and remove any sediment which may have accumulated on the upper surface of the water softening material. This upward flow of wash water is secured by closing the valve 89 in the upper branch 82 of the supply pipe, opening the valve 88 in the lower branch 81 of the supply pipe and opening a valve 91 in the drain pipe 90, thereby permitting the water to enter the container at the lower end thereof and to pass upwardly through the same and out through the drain pipe 90. At the end of the preliminary washing operation the valves 91 and 88 are closed and the valves 89 in the upper branch 82 of the supply pipe, the valve 87 of the regenerating solution pipe and the valve 93 of the drain pipe 92 are opened, thus causing the water and regenerating solution to enter the container at the upper end thereof and to be discharged through the drain pipe 92 from the bottom of the container. At the end of the regenerating operation the valve 87 is closed so that clear water will pass downwardly through the container and out through the drain pipe 92 to carry the salt solution out of the container and to rinse and thoroughly clean the water softening material. At the end of this final washing operation the valve 93 is closed, thus causing the water which enters the container through the pipe 82 of the supply pipe to be discharged through the service pipe 84. The several valves are automatically operated at periods determined by the quantity of water which is delivered to the container from the supply pipe and is preferably controlled by the operation of a motor 95 which is operated by the water delivered to the container and, in the present instance, is interposed in the supply pipe in advance of the container. In the arrangement here shown the valves 88, 89 and 91, are operated by a single quick opening device 96 which is shown in detail in Figs. 5 to 8. The connections between the quick opening device and the valves are such that the valves 88 and 91 will be opened and the valve 89 closed simultaneously, and vice versa. A second quick opening device 97 is connected with the drain valve 93, and the valve 87 in the regenerating solution pipe is controlled by an operating device 98 similar to that shown in Fig. 7.

In Figs. 5 to 9, I have shown in detail the controlling mechanisms for the several valves. As here shown, a water motor 95 is interposed in the supply pipe 80 so that it will be operated by the water passing through that pipe. This motor is of a well known type and it is not necessary to describe the same in detail. Suffice it to say that the flow of water through the motor, which also measures the water and thus constitutes a meter, causes the rotation of a motor shaft 18 which projects upwardly through the top of the motor casing and is journaled at its upper end in a frame 19 rigidly secured to the motor casing and serving to support the various parts of the controlling mechanism. The shaft 18 has secured thereto a worm 20 which meshes with a worm wheel 21 secured to a transverse shaft 22 journaled in bearings 23 also carried by the frame 19.

The operation of the valves may be controlled by any suitable mechanism which will cause them to open and close at the proper intervals but preferably the timing is effected by means of cams. In the present apparatus, the valve 87 for the regenerating solution pipe 86 is actuated by the device indicated at the reference numeral 98 in Fig. 1 and shown in detail in Fig. 7 and comprises a reciprocatory valve stem 24 which is connected with one end of a lever 25 which in turn is pivotally mounted on a supporting link 26 carried by a fixed support which, in the present instance, is mounted on the valve casing 27. The outer end of the lever 25 is connected with an actuating rod 28 which is guided in a part of the frame 19, and the lower end of which carries a roller 29 which is held in engagement with a cam 30 on the shaft 22 by means of a spring 31 acting on the lever 25. The arrangement is such that when the roller is in engagement with the peripheral portion of the cam surface the valve will be held in its closed position but when the cut away portion of the cam is brought into line with the roller the spring 31 will open the valve and retain the same open until the roller again engages the periphery of the cam. It will thus be apparent that the valve will be opened once on each complete rotation of the cam shaft 22 and will be held open for a period of time controlled by the shape of the cam. The speed of the shaft 22 is so controlled as to permit the desired quantity of water to be delivered to the container between the successive openings of the valve.

It is desirable that the valves 91 and 92 of the drain pipes should be quickly opened and closed and I have shown in Figs. 5, 6, 8 and 9, an apparatus which will effect this quick opening and closing of the valves, the actuating devices 96 and 97 for the two valves being identical in construction. Each valve comprises a reciprocatory valve stem 32, one end of which is connected with a lever 33 pivotally mounted on the upper end of a link 34, the lower end of which is mounted on a fixed support, in the present instance a part 35 carried by the valve casing. The opposite end of the lever 33 is pivotally connected with the upper end of an actuating rod 36, the lower end of which is slidably mounted in an axial recess formed in the upper end of a plunger 37 which is guided in a suitable bearing in the frame 19. The lower end of this plunger is provided with two projections or rollers 38 and 39 which are here shown as projecting in opposite directions from the plunger and which are arranged to be acted on respectively by cams 40 and 41 secured to the cam shaft 22. These cams are here shown as snail cams and are so arranged with relation one to the other that the valve will be held in its closed and open positions for the desired periods of time. It will be noted that the arrangement of the cams with relation to the plunger is such that the cam 40 will move the plunger upwardly and the cam 41 will move the same downwardly. The connection between the plunger 37 and the actuating rod 36 is such that these parts may have relative movement, and operative movement will not be imparted to the rod 36 and to the valve until just before the cam, 40 or 41, clears its roller on the plunger. As here shown, the actuating rod 36 has secured thereto and projecting from the opposite sides thereof, tapered projections 42 which, if desired, may consist of the opposite edges of a diamond shaped plate rigidly secured to the rod and projecting beyond the respective sides thereof. The angles or apices of the two projections or angular plate 42 are arranged in transverse alinement. Cooperating with these tapered projections or angular plate 42 are bell crank levers 43 each having one arm pivotally mounted on a collar 44 secured to the upper end of the plunger 37 and having their other ends connected one to the other by means of springs 45 which will tend to move the angles of the two levers one toward the other. Each lever is provided at the angle thereof with a stud or roller 46, which rollers engage with the respective plate 42 and are held in contact therewith by the springs 45. With the parts in the positions shown in Figs. 5 and 6 the levers 43 are acting on the lower inclines of the tapered parts 42 and thus serve to hold the actuating rod 36 in its uppermost position with the valve closed. In these drawings, however, the cam 40 has moved the plunger almost to its uppermost position and a slight further movement of the cam will force the studs or rollers 46 across the apices or widest points of the plate 42 and thus cause the rollers or studs 46 to act upon the upper inclined edges of the plate 42, which will result in the plate and the rod being moved quickly downward and the valve opened. When the cam 40 clears the roller 38 on the plunger the plunger will be retained in its uppermost position by the contact of the rollers or studs 46 with the upper inclined edges of the plate 42. As the cam shaft continues to rotate the cam 41 will force the plunger downwardly and just before the plunger reaches the lower limit of its movement by the cam 41 the rollers 46 on the levers 43 will again pass the wide points or apices of the plate 42 and will act upon the lower inclined surfaces of the plate to impart upward movement to the actuating rod and thus close the valve. The valves 88 and 89 in the two branches of the supply pipe are controlled by the actuating device 96 and to this end are connected with the actuating rod 36 by levers 33 similar to the connections between the rod 36 and the valve 91, but the fulcrums for the two levers are arranged on opposite sides of the valve stems so that when one valve is opened the other will be closed, thus providing a constant connection between the supply pipe 80 and the container. In the present arrangement the valve 88 will be opened when the drain valve 91 is opened and the valve 89 will be closed at that time.

The arrangement shown in Fig. 2 is similar to that shown in Fig. 1 except that the flow of water being softened is upward instead of downward and the preliminary upward flow of wash water is eliminated. As there shown, the supply pipe 99 is divided into two branches, 100 and 101, controlled by separate valves 102 and 103, and these branches lead respectively to the lower and upper ends of the container 104. The service pipe 105 leads from the upper end of the container and is controlled by a positively operated valve 106. A single drain pipe 107 is connected with the lower portion of the container and, in the present instance, this connection is made through the branch 100 of the supply pipe. The drain pipe 107 is controlled by a valve 108. The brine tank 109 is connected by a pipe 110 with the upper branch 101 of the supply pipe and pipe 110 is controlled by a valve 111. During the softening operation the valves 111, 103 and 108 are closed and the valve 102 in the branch 100 of the supply pipe and the valve 106 in the service pipe are open. During the regenerating operation the valves 102 and 106 are closed and the valve 103 in the branch 101 of the supply pipe is open, the valve 111 of the regenerating solution pipe is open and the valve 108 of the drain pipe is open, thus causing the water and salt solution to enter the upper end of the container and to be discharged from the lower end thereof through the drain pipe 107. At the end of the regenerating operation the valve 111 is closed and the wash water flows downward through the container and out through the drain pipe 107. At the end of the washing operation the valves 108 and 103 are closed and the valves 102 and 106 are opened thus again establishing the softening operation. The valves 102, 103, 106 and 108 are all actuated by a single quick opening device 112 similar to that above described and the valve 111 is controlled by a cam operated device 113 also similar to that above described and both valve actuating devices are operated by a motor 114 interposed in the supply pipe 99.

The arrangement shown in Fig. 3 utilizes an upward flow of water during the softening operation and a downward preliminary flow of wash water, this being particularly useful where the water which is being softened carries a large amount of sediment which will collect on the lower surface of the water softening material and should be dislodged prior to the regenerating operation. Here also a supply pipe 115 is divided into two branches, 116 and 117, which are controlled by separate valves 118 and 119 and are connected respectively with the lower and upper ends of the container 120. The service pipe 121 leads from the upper end of the container and is controlled by a positively operated valve 122. A drain pipe 123 is connected with the upper portion of the container through the branch 117 of the supply pipe and is controlled by a valve 124. A second drain pipe 125 is connected with the lower part of the container through the branch 116 of the supply pipe and is controlled by a valve 126. The regenerating solution pipe 127 is connected with the lower part of the container through the branch 116 of the supply pipe and is controlled by a valve 128. During the water softening operation the valve 119 of the branch 117 of the supply pipe, the valve 128 of the regenerating solution pipe and the valves 124 and 126 of the drain pipes are closed and the valve 118 of the branch 116 of the supply pipe and the valve 122 of the service pipe are open, thus causing the water to be softened to flow upwardly through the water softening material and out through the service pipe 121. At the beginning of the reconditioning operation the valves 118 and 122 are closed and the valve 119 in the branch 117 of the supply pipe and the valve 126 of the drain pipe 125 are opened, thus causing the downward flow of wash water through the water softening material. At the end of this preliminary washing operation the valves 119 and 126 are closed and the valve 118 of the branch 116 of the supply pipe, the valve 128 of the regenerating solution pipe and the valve 124 of the drain pipe 123 are opened, thus causing the water and regenerating solution to enter the lower end of the container and pass upwardly therethrough and out through the drain pipe 123. It is not necessary that the valve 122 in the service line should be closed during the upward flow of the liquid and as a matter of convenience of operation it is so connected with the valve actuating mechanism that it will be open during the regenerating operation, the check valve in the service line insuring against back flow of water therefrom. At the end of the regenerating operation the valve 128 is closed so that clear water will pass up through the water softening material and out through the drain pipe 123. At the end of this final washing operation the valve 124 is closed, thus restoring the water softening operation. The valves 118, 126, 119 and 122, are all actuated by a single quick opening device 129. A second quick opening device 130 controls the valve 124, and an actuating device 131 controls the line valve 128. The quick opening devices 129 and 130 are similar to those shown in Figs. 5, 6, 8 and 9, while the actuating device 131 is similar to that shown in Fig. 7, all of which are controlled from a motor 132 interposed in the main supply line 115.

In the arrangement shown in Fig. 4, a main supply pipe 133 is divided into two branches 134 and 135 connected respectively with the lower and upper ends of a container 136 and controlled respectively by valves 137 and 138. The service pipe 139 leads from the lower end of the container 136 and is provided with a check valve 140. A single drain pipe 141 is connected with the upper part of the container through the branch 135 of the supply pipe and is controlled by a valve 142. A regenerating solution pipe 143 is connected with the lower branch 134 of the supply pipe and is controlled by a valve 144. During the softening operation the valves 137, 142 and 144 are closed and the valve 138 is open, thus causing the water to enter the upper end of the container and to be discharged from the lower end thereof through the service pipe 139. During the regenerating operation the valve 138 is closed and the valve 137 in the lower branch of the supply pipe is opened and the valve 144 in the regenerating solution pipe and the valve 142 in the drain pipe are open. Thus the water and regenerating solution will flow upward through the water softening material and out through the drain pipe 141. At the end of the regenerating operation the valve 144 is closed and water only will pass upwardly through the water softening material and out through the drain pipe 141. At the end of the reconditioning operation the valves 142 and 137 are closed and the valve 138 opened. The valves 137, 138 and 142 are controlled by a single quick opening device 145 similar to that shown in Figs. 5, 6, 8 and 9, and the regenerating solution valve 144 is controlled by an actuating device 146 similar to that shown in Fig. 7 and both actuating devices are controlled by a motor 147.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a water softening apparatus, a container for water softening material, a supply pipe for hard water having means for connecting the same with either end of said container, valves to control said connections, a service pipe connected with one end of said container, a drain pipe connected with one end of said container, valves for said drain pipe, a source of supply for regenerating solution having means for connecting the same with that end of said container opposite said drain pipe, and means moved by the flow of water delivered to said container by said supply pipe for actuating said valves to cause water to flow through said container first in one direction and then in the other direction and for establishing the connection between said container and said source of supply for regenerating solution while the water is flowing to said drain pipe.

2. In a water softening apparatus, a container for water softening material, a supply pipe for hard water having means for connecting the same with either end of said container, valves to control said connections, a service pipe connected with said container, a drain pipe connected with said container, a valve for said drain pipe, a regenerating solution pipe connected with said container, a valve in said regenerating solution pipe, and means moved by the flow of water delivered to said container by said supply pipe for actuating said valves.

3. In a water softening apparatus, a container for water softening material, a supply pipe for hard water having means for connecting the same with either end of said container, valves to control said connections, a service pipe connected with said container, a drain pipe connected with said container, a valve for said drain pipe, a regenerating solution pipe connected with said container, a valve in said regenerating solution pipe, means moved by the flow of water delivered to said container by said supply pipe for actuating said valves, and an automatically operated valve to interrupt the connection between said service pipe and said container while the valve in said drain pipe is open.

4. In a water softening apparatus, a container for water softening material, a supply pipe for hard water having means for connecting the same with either end of said container, valves to control said connections, a service pipe connected with said container, a drain pipe connected with said container, a valve for said drain pipe, a regenerating solution pipe connected with said container, a valve in said regenerating solution pipe, a motor moved by the water delivered to said container by said supply pipe, and means controlled by said motor for actuating said valves in timed relation one to the other.

5. In a water softening apparatus, a container for water softening material, a supply pipe for hard water having means for connecting the same with either end of said container, valves to control said connections, a service pipe connected with said container, a drain pipe connected with one end of said container, a valve for said drain pipe, a regenerating solution pipe connected with the other end of said container, a valve in said regenerating solution pipe, and means moved by the flow of water delivered to said container by said supply pipe to automatically open and close the several valves in such relation one to the other that water will first flow through said container to said service pipe and will then flow through said container in the opposite direction to said drain pipe and regenerating solution will be delivered to said container while the water is flowing in the last mentioned direction.

6. In a water softening apparatus, a container, a supply pipe for hard water comprising two branches connected with said container near the respective ends thereof, a service pipe leading from one end of said container, a drain pipe leading from one end of said container, a regenerating solution pipe leading to that end of said container opposite said drain pipe, separate valves in the two branches of said supply pipe, in said drain pipe and in said regenerating solution pipe, a motor moved by the water delivered to said container, and means controlled by said motor to actuate said valves to cause the water to flow through said container first to one direction and then in the other direction and to connect said regenerating solution pipe with said container while the valve in said drain pipe is open.

7. In a water softening apparatus, a container, a supply pipe for hard water comprising two branches connected with said container near the respective ends thereof, a service pipe leading from one end of said container, a drain pipe leading from one end of said container, a regenerating solution pipe leading to that end of said container opposite said drain pipe, separate valves in the two branches of said supply pipe and in said drain pipe, a motor moved by the water delivered to said container, means controlled by said motor to actuate said valves to cause the water to flow through said container first in one direction and then in the other direction, and automatically controlled valves to connect said regenerating solution pipe with said container and to disconnect said service pipe from said container while said drain valve is open.

8. In a water softening apparatus, a container for water softening material, a supply pipe for hard water comprising two branches connected with said container near the respective ends thereof, a service pipe leading from one end of said container, a regenerating solution pipe connected with one branch of said supply pipe, a drain pipe connected with said container near that end opposite that at which said last mentioned branch of said supply pipe is connected, separate valves in the two branches of said supply pipe and said drain pipe, a motor moved by flow of the water delivered to said container by said supply pipe, and means controlled by said motor for automatically actuating said valves to cause liquid to flow through said container first in one direction and then in the other direction, and means for automatically controlling the flow of regenerating solution to said container.

9. In a water softening apparatus, a container for water softening material, a supply pipe for hard water comprising two branches connected with said container near the respective ends thereof, a service pipe leading from one end of said container, a regenerating solution pipe connected with one branch of said supply pipe, a drain pipe connected with said container near that end opposite that at which said last mentioned branch of said supply pipe is connected, separate valves in the two branches of said supply pipe, in said regenerating solution pipe and in said drain pipe, a motor moved by the water delivered to said container by said supply pipe, and means controlled by said motor for automatically operating said valves to cause liquid to flow through said container first in one direction and then in another direction.

10. In a water softening apparatus, a container for water softening material, a supply pipe for hard water comprising two branches connected with said container near the respective ends thereof, separate valves for the two branches of said supply pipe, a service pipe leading from one end of said container, a regenerating solution pipe connected with one branch of said supply pipe, a valve for said regenerating solution pipe, and a drain pipe connected with the other branch of said supply pipe between said container and its controlling valve, a valve to control said drain pipe, and means moved by flow of the water delivered to said container by said supply pipe for actuating said valves.

11. In a water softening apparatus, a container for water softening material, a supply pipe comprising two branches connected with said container near the respective ends thereof, separate valves for the two branches of said supply pipe, a service pipe leading from one end of said container, a regenerating solution pipe connected with said container, a valve in said regenerating solution pipe, drain pipes connected with the respective branches of said supply pipe between said container and the valves in said branches, separate valves in said drain pipes, and means moved by flow of the water delivered to said container by said supply pipe for automatically actuating the several valves in timed relation one to the other.

12. In a water softening apparatus, a container for water softening material, a supply pipe comprising two branches connected with said container near the respective ends thereof, separate valves for the two branches of said supply pipe, a service pipe leading from one end of said container, a regenerating solution pipe connected with said container, a valve in said regenerating solution pipe, drain pipes connected with the respective branches of said supply pipe between said container and the valves in said branches, separate valves in said drain pipes, and means moved by flow of the water delivered to said container by said supply pipe for automatically actuating said valves to cause the water to be softened to flow through said container in one direction during the softening operation, to cause initial wash water to flow through said container in the opposite direction and to cause regenerating solution and the final wash water to flow through said container successively in the first mentioned direction.

13. In a water softening apparatus, a container for water softening material, a supply pipe comprising two branches connected with said container near the respective ends thereof, separate valves for the two branches of said supply pipe, a service pipe leading from one end of said container, a regenerating solution pipe connected with said container, a valve in said regenerating solution pipe, drain pipes connected with the respective branches of said supply pipe between said container and the valves in said branches, separate valves in said drain pipes, a motor moved by the water delivered to said container by said supply pipe, devices operated by said motor for actuating the several valves in such relation one to the other as to cause water to flow through said container in one direction during the softening operation, to cause initial wash water to flow through said container in the opposite direction and to cause regenerating solution and final wash water to flow successively through said container in the first mentioned direction.

14. In a water softening apparatus, a container for water softening material, a supply pipe comprising two branches connected with said container near the respective ends thereof, separate valves for the two branches of said supply pipe, a service pipe leading from one end of said container, a regenerating solution pipe connected with said container, a valve in said regenerating solution pipe, drain pipes connected with the respective branches of said supply pipe between said container and the valves in said branches, separate valves in said drain pipes, and means controlled by the water delivered to said container by said supply pipe for automatically actuating said valves in such relation one to the other as to cause water to flow upwardly through said container during the softening operation to cause water to flow downwardly through said container during an initial washing operation, to cause regenerating solution to flow upwardly through said container during the regenerating operation and to cause water to flow upwardly through said container during the final washing operation.

15. In a water softening apparatus, a container for water softening material, a supply pipe comprising branches connected with said container near the respective ends thereof, separate valves for said branches, a service pipe leading from said container near one end thereof, a pipe for regenerating solution leading to said container, a valve for said pipe, drain pipes connected with said container near the respective ends thereof, separate valves for said drain pipes, and means moved by flow of the water delivered to said container by said supply pipe for automatically operating the several valves in such relation one to the other as to cause water to flow through said container in one direction during the softening operation, to cause water to flow through said container in the opposite direction during an initial washing operation, to cause regenerating solution to flow through said container in the first mentioned direction during the regenerating operation and to cause wash water to flow through said container in the first mentioned direction during the final washing operation.

16. In a water softening apparatus, a container for water softening material, a supply pipe having branches connected with said container near the respective ends thereof, a separate valve for each branch of said pipe, a service pipe leading from one end of said container, a regenerating solution pipe connected with said container, a valve in said pipe, a drain pipe connected with said container, a valve to control said drain pipe, and means moved by flow of the water delivered to said container by said supply pipe for automatically actuating said valves in such relation one to the other that will cause the liquid to flow through the container in one direction during one operation of said apparatus and to flow through said container in another direction during another operation of said apparatus.

17. In a water softening apparatus, a container for water softening material, a supply pipe having branches connected with said container near the respective ends thereof, a separate valve for each branch of said pipe, a service pipe leading from one end of said container, a regenerating solution pipe connected with one end of said container, a valve for said pipe, a drain pipe connected with that end of said container opposite said regenerating solution pipe, a valve to control said drain pipe, valve actuating devices operatively connected with said valves, a motor interposed in the supply pipe for hard water, and operative connections between said motor and said valve actuating devices.

18. In a water softening apparatus comprising a container for water softening material, a soft water service pipe, a regenerating solution pipe, a drain pipe, and a hard water supply pipe having connections with both ends of said container, valve means adapted to direct the supply of hard water through said container alternately in opposite directions to the service pipe and to the drain pipe respectively, and means moved by flow of the water delivered to said container by said supply pipe for controlling said valve means to direct the supply of hard water through the container in each of said alternate directions for predetermined intervals.

19. In a water softening apparatus comprising a container for water softening material, a soft water service pipe, a regenerating solution pipe, a drain pipe and a hard water supply pipe having connection with both ends of said container, valve means adapted to reverse the direction of the flow of hard water through said container in effecting regeneration of the water softening material, a motor moved by flow of the water passing through said supply pipe, said motor being adapted to actuate said valve means to effect said reversal of flow and to automatically control the duration of said reversal.

20. In a water softening apparatus comprising a container for water softening material, a soft water service pipe, a drain pipe, a hard water supply pipe having connection with both ends of said container, valve means for causing hard water to flow from said supply pipe through said container alternately in opposite directions to said service pipe and to said drain pipe respectively, means for introducing regenerating solution into said container while said hard water is flowing in said drain pipe and for terminating the delivery of said regenerating solution, thereby causing wash water to flow through said container to said drain pipe, a motor adapted to be moved by the flow of water through said supply pipe, and means controlled by said motor to actuate said valve means and to determine the duration of flow of said wash water.

21. In a water softening apparatus, a container for water softening material, a soft water service pipe communicating with said container, a drain pipe communicating with said container, a hard water supply pipe leading to said container, a regenerating solution pipe leading to said container, means to cause regenerating solution and wash water to pass through said container in one direction to said drain pipe and water to be softened to pass through said container in the other direction to said service pipe and a motor moved by flow of the water delivered to said container by said supply pipe, said motor controlling said means to cause said operations to take place consecutively and to determine the duration of the passage of regenerating solution and of wash water.

EDWARD T. TURNER.